United States Patent [19]

Buggisch et al.

[11] 3,837,404

[45] Sept. 24, 1974

[54] COMPOSITIONS FOR BINDING DUST IN COAL MINES

[76] Inventors: Heinz Buggisch, Saarbrucker Str. 5, Cologne-Ostheim; Hans Lewer, Waldstrasse 32, 581 Witten-Annen, Germany

[22] Filed: May 11, 1973

[21] Appl. No.: 359,385

Related U.S. Application Data

[63] Continuation-in-part of Ser. No. 74,842, Sept. 23, 1970, abandoned, which is a continuation of Ser. No. 817,298, April 17, 1969, abandoned, which is a continuation of Ser. No. 581,681, Sept. 26, 1966, abandoned.

[30] Foreign Application Priority Data

Sept. 28, 1965   Germany................................ 36992

[52] U.S. Cl...................................... 169/45, 169/64
[51] Int. Cl............................................... A62c 3/00
[58] Field of Search......... 169/1 A, 2 R, 43, 45, 64; 252/88

[56] References Cited
UNITED STATES PATENTS

| | | | |
|---|---|---|---|
| 2,924,279 | 2/1960 | Hofbauer et al. | 169/1 A |
| 3,333,896 | 8/1967 | Diamanti | 169/2 R X |
| 3,545,547 | 12/1970 | Irgon | 169/2 R |
| 3,595,317 | 7/1971 | Bell | 169/2 R |
| 3,684,022 | 8/1972 | Peterson | 169/2 R |

*Primary Examiner*—Lloyd L. King
*Assistant Examiner*—Michael Y. Mar
*Attorney, Agent, or Firm*—Gerard J. Weiser, Esq.

[57] ABSTRACT

The present invention relates to a composition for binding dust in coal mines comprising calcium chloride to compositions suitable for binding such coal dust and an improved method of binding coal dust in coal mines.

13 Claims, No Drawings

COMPOSITIONS FOR BINDING DUST IN COAL MINES

This application is a continuation-in-part of Ser. No. 74,842, filed Sept. 23, 1970, now abandoned, which in turn was a continuation of Ser. No. 817,298, filed Apr. 17, 1969, now abandoned, which in turn was a continuation of Ser. No. 581,681, filed Sept. 26, 1966, now abandoned.

In coal mining, coal dust explosions and fires in underground mines may, as is known, be prevented by adsorptively binding and throughly moistening the coal dust deposited. According to 'Glueckauf', 15 (1910), page 45, hygroscopic salts such as, for example, calcium chloride or magnesium chloride, may be used in the form of an aqueous solution or as powder, flakes or scales, to bind dust deposited on the gallery sole. In French patent specification 816,005, it has already been recommended to mix the aforementioned hygroscopic salts or their solutions with substances which reduce the surface tension of the solutions of these salts, in order to wet the coal dust deposited more thoroughly.

As may be seen from German patent specification 943,701 and an article published in 'Glueckauf', 87 (1951), page 248 ff., the use of hygroscopic salts for binding dust in coal mining was restricted to the soles of galleries since neither highly concentrated salt solutions nor thoroughly wetted salt pastes could be made to adhere to the faces or roofs of the galleries. It was found that the adhesive properties of mixtures of residual salt, magnesium chloride and powdered salt, to which calcium hydroxide may also be added in small quantities, are sufficient to make them adhere to the roofs or faces of the timber-supported headway at least for some time.

However, these mixtures have only a very limited ability to bind coal dust. These mixtures were thus only applied to the roofs and the faces of the timber-supported headway as an adhesive layer, and a day later covered with a layer of coarse residual salt, to which a further 5 percent of calcium hydroxide was added. Both layers were applied by means of compressed air (cement gun). Instead of the adhesive layer of salt, it is also possible, according to German patent 947,602, to employ an adhesive such as, for example, sulphite waste liquor, with which the roofs and faces are coated before the residual salt is applied.

The residual salt which consists essentially of sodium chloride, is obtained in the preparation of potassium and still contains small quantites of kieserite, anhydrite and also argillaceous constituents. It has good dust-binding properties in ventilated galleries, in which the atmospheric relative humidity is below 75 percent, if it is moistened at intervals.

In order to bind dust in coal mines, in which the atmospheric relative humidity is over 75 percent, it is recommended, in British patent specification 753,186, to spread salt (sodium chloride) in a dry state on the surface of the gallery to give it an opportunity to absorb moisture from the air. Then a non-ionogenic wetting agent and a gelatinous carrier, such as, for example, magnesium hydroxide gel, are added to the solution obtained.

Moreover, in accordance with the instructions of the German Chief Office of Mines of May 5, 1954, in which guiding principles are given for combating dust in underground operations, it is mentioned that hygroscopic salts may only be applied to roofs and faces in the form of a paste which contains an inorganic gelling agent.

According to this state of the art, it previously has not been possible in the mining of coal to produce a layer on the roofs and faces of a timber-supported headway by a single application of a dry carrier free of gelling agent free salt which will adhere satisfactorily to the base to which it is applied and bind the dust as it settles (dust produced during mining operation).

It is an object of the present invention to provide a composition and method which solves this problem.

According to the invention, it was found that this object could be achieved, when using hygroscopic salts which if desired may also contain wetting agents for binding coal dust occurring in mining of coal, particularly on the roofs and faces when the surfaces of the timber-supported galleries are coated with a fine grained solid hygroscopic calcium chloride salt in which the proportion of particles with a diameter below 1 mm is greater than 80 wt. percent and the proportion of the particles with a diameter below 0.3 mm is more than 60 wt. percent.

The particle size and the relative proportion of the two sizes of particles play a determinative role in the composition of the invention, giving it the desired properties. When particle sizes larger than 1 mm predominate in the presence of particles greater than 0.3 mm (in a proportion greater than 60 wt. percent), the powder could not be blasted satisfactorily away in the air gun which is used to apply the powder to the walls of the mines. To the extent that particles did reach the surface to be coated, they did not adhere satisfactorily. When particles smaller than those specified herein were used, they caused such a dense dust and fog in the air that other workers that were carrying out other related operations in the mine were seriously hampered in their work. Respiratory and serious skin irritations were caused.

In further experiments, it was determined that with the calcium chloride powder mixture used, no adverse effects were inflicted on persons even as close as 300 meters behind the blasting station. This is a very important advantage when considering health and safety factors. Safe operations can be carried out behind the blasting station without health or safety hazards. It is another advantage of the powder of the invention that unlike previously known compositions, it is a dry powder, essentially water-free. Thus, the powders also contribute to creating an improved, dryer climate in the mine gallery. When one consideres that the atmosphere and other conditions coal mines vary enormously from mine to mine, it is most surprising that the powder mixture used gives the desired results uniformly.

The fine-grained hygroscopic salts which are suited for carrying out the invention are the calcium chloride salts. Because of the small size of the particles, these salts are dispersed in a stream of air which is successively directed under pressure onto all parts of the gallery surface. The dusting of the gallery surface with the hygroscopic salts is best carried out by means of a dusting appliance which is operated with compressed air. The quantity of hygroscopic salts used is essentially governed by the amount of coal dust occurring. As a basic guide, it is recommeded that 0.15 to 0.6 kg hygroscopic salts per square meter surface area be used.

The fineness of the particles and the large surface area of the hygroscopic salts employed according to the invention causes these salts to adhere to the surfaces and in particular to the roofs and faces of the gallery where they deliquesce upon absorbing water from the surrounding air. The solutions of hygroscopic salts produced thereby rapidly and lastingly moisten the dust deposited on the surfaces of the gallery.

Although this is not a requirement of the invention, wetting of the coal dust may be aided by adding to the hygroscopic salts before their use in the dusting operation 1 to 3 wt. percent of wetting agents which, such as alkylphenolpolyglycol ethers, for example, are compatible with (do not react with) the hygroscopic salts. The alkylphenolpolyglycol ethers preferably contain more than 5 carbon atoms in the alkyl group and more than 5 glycol radicals in the molecule. It is advantageous to use a wetting agent of such constitution that one of its components ensures that the coal dust is wetted as quickly as possible, and another ensures that as much dust as possible is bound, the binding being expressed in kg of coal dust per kg of 100 percent hygroscopic $CaCl_2$. The wetting agent may, for example, be a combination of two-thirds of the product known under the trade name of 'Marlophen X' (a dialkylphenolpolyglycol ether containing 4–6 glycol groups and in which the alkyl groups are lower alkyl and one-third of the product known under the trade name of 'Marlophen 89' (an alkylphenolpolyglycol ether containing about 9 glycol groups and in which the alkyl group is the n-nonyl group).

Upon application of the finely divided solid hygroscopic calcium chloride employed according to the invention to the surfaces of coal mines coming into contact with coat dust, a paste is formed from such hygroscopic salts, the coal dust already deposited on such surfaces and the moisture from the surrounding atmosphere. Such paste is then capable of binding further quantities of coal dust which subsequently settles thereon. When the dust binding properties of the paste diminish, they can be regenerated by blasting of the finely divided calcium chloride according to the invention.

When moistened, the hygroscopic salts used according to the invention bind approxiamtely 4 to 5 times their own weight of coal dust. Hygroscopic salts of the requisite fineness can be manufactured as products containing little or practically no water, for example, 5 to 20 wt. percent. Hygroscopic salts having the following particle size distribution have proved particularly satisfactory:

| | |
|---|---|
| 0.5 – 1.0 mm | 3 per cent by weight |
| 0.33 – 0.5 mm | 5 per cent by weight |
| 0.2 – 0.3 mm | 22 per cent by weight |
| 0.1 – 0.2 mm | 36 per cent by weight |
| – 0.1 mm | 34 per cent by weight |

The degree of fineness of the hygroscopic salts employed is of paramount importance for the formation of the paste consisting of the salts and coal dust. This type of paste will not form or will only form to a very limited degree with coarser flakes or scales of hygroscopic salts traditionally used for treating mine soles, which, as solid salts, with a particle size of approximately 0.2 to 1.0 cm, have a water content of more than 20 percent by weight. It is noteworthy that when coarser salts of calcium chloride is caused to adhere to the roofs and faces of galleries without the addition of adhesives simply by throwing it onto these areas, a concentrated solution is produced on the surface of these particles from the water absorbed from the air. This solution forms a separating layer between the underlying base and the individual salt particles, as a result, the portion of the salt particle which has not yet deliquesced slides downwards ot even drops off under the effects of gravity. Thus, the greater part of the coarse salt particles would be ineffective as an agent for binding the dust on the roofs and faces of coal mines. This disadvantage does not occur in the case of the hygroscopic salts used according to the invention, since because of their large surface area, they readily adhere to the base to which they are applied and deliquesce rapidly without forming an intermediate layer.

Moreover, a further advantage of using the fine-grained hygroscopic salts of the distribution of sizes described is that these salts may also be easily transported and employed in galleries where there are no timbers. Since fine-grained salts used according to the invention only have a low water content, a larger quantity of effective material per unit of volume is moved during transportation than is the case with most other dust-binding agents. Thus, because of high concentration of solid matter in the fine-grained salts used according to the invention, the transportation of the water and adhesives contained in other dust-binding agents, sometimes in considerable quantities, is obviated.

The layers produced from coal dust and hygroscopic salts according to the invention continue to absorb water from the surrounding air, until the pressure of the water-vapor above these layers or over the salt solutions contained in them is in equilibrium in the partial pressure of the water-vapor of the surrounding air. The effect of the salts employed according to the invention is thus largely dependent on the ventilation and moisture conditions prevalent in the mine when they are used.

According to the invention, it is now also possible, by the technically simple procedure of applying dry salts, to produce layers on the roofs and faces of galleries in coal mines which readily adhere to the underlying base and bind previously deposited as well as subsequently settling coal dust rapidly and most effectively, so that it can no longer take part in gas or coal dust explosions.

The following are illustrative examples of suitable coal dust binding compositions according to the invention. The particle size distribution of such compositions is that which as indicated above has proved particularly satisfactory. The proportions given are in part by weight.

EXAMPLE 1

81.0 parts calcium chloride
1.2 parts NaCl
2.0 parts Marlophen X (wetting agent of high coal dust wetting capacity)
1.0 part Marlophen 89 (wetting agent of high coal dust binding capacity)
14.8 parts water

EXAMPLE 2

88.0 parts calcium chloride
1.4 parts NaCl
2.0 parts Marlophen X 1.0 part Marlophen 89

7.6 parts water

These examples are merely illustrative. The calcium chloride powders are stored until use in plastic bags. The powder is blasted onto the ceilings and walls in an amount of 90 kg over a 30 meter distance in experiments lasting 30 minutes each. We claim:

1. A dry finely divided powdery mixture for binding coal dust on coal mines' surfaces for preventing coal dust explosions and fires in underground mines, said mixture comprising a solid hygroscopic salt mixture of calcium chloride particles of different sizes in which the proportion of particles with a diameter below 1 mm is greater than 80 wt. percent and the proportion of particles with a diameter below 0.3 mm is more than 60 wt. percent.

2. The mixture of claim 1 which contains about 3 percent by weight of particle sizes of 0.5 to 1.0 mm.

3. The mixture of claim 1 which contains about 5 percent by weight of particle sizes of 0.33 to 0.5 mm.

4. The mixture of claim 1 which contains 36 percent by weight of particle sizes of 0.1 to 0.2 mm.

5. In a coal mine, a surface of a roof or gallery wall coated with a dry finely divided solid hygroscopic salt powdery mixture for preventing coal dust explosions and fires, said mixture comprising calcium chloride particles of different sizes in which the proportion of particles with a diameter below 1 mm is greater than 80 wt. percent and the proportion of particles with a diameter below 0.3 mm is more than 60 wt. percent.

6. The process of binding coal dust for preventing coal dust explosions and fires in underground mines which comprises dispersing in a stream of compressed air in a coal mine a dry finely divided solid hygroscopic salt powdery mixture of calcium chloride particles of different sizes in which the proportion of particles with a diameter below 1 mm is greater than 80 wt. percent and the proportion of particles with a diameter below 0.3 mm is more than 60 wt. percent, directing and causing said dispersed mixture of salts in air onto the coal mines' surfaces which come into contact with coal dust where it is deposited and adheres, forming on said surfaces by a single application a paste by deliquescence of the hygroscopic salts upon absorbing water from the surrounding air and dust already deposited on such surfaces, and forming thereby a coating which adheres to but does not slide downward or drop off said surfaces under the effect of gravity, and which is capable of binding further quantities of coal dust which subsequently settle thereon.

7. The surface of claim 5 which is a roof.

8. The powdery mixture of claim 1 which comprises an alkylphenol-polyglycol ether wetting agent.

9. The powdery mixture of claim 8 wherein the wetting agent comprises a dialkylphenolpolyglycol ether having 4 to 6 glycol groups and, wherein the alkyl is lower alkyl and an alkylphenolpolyglycol ether having about 9 glycol groups and, wherein the alkyl is n-nonyl.

10. In the coal mine of claim 5, the surface coated with the powdery mixture whichc oomprises as a wetting agent, an alkylphenolpolyglycol ether.

11. The surface of claim 10 wherein the powdery mixture comprises a dialkylphenolpolyglycol ether having 4 to 6 glycol groups and, wherein the alkyl is lower alkyl and an alkylphenolpolyglycol ether having about 9 glycol groups and, wherein the alkyl is n-nonyl.

12. The process of claim 6 wherein the powdery mixture comprises an alkylphenolpolyglycol ether wetting agent.

13. The process of claim 12 wherein the wetting agent comprises a dialkylphenolpolyglycol ether having 4 to 6 glycol groups and, wherein the alkyl is lower alkyl and analkylphenolpolyglycol ether having about 9 glycol groups and, wherein the alkyl is n-nonyl.

* * * * *